Feb. 25, 1969   R. G. FORCE   3,429,586
HITCH PIN CONSTRUCTION
Filed March 6, 1967
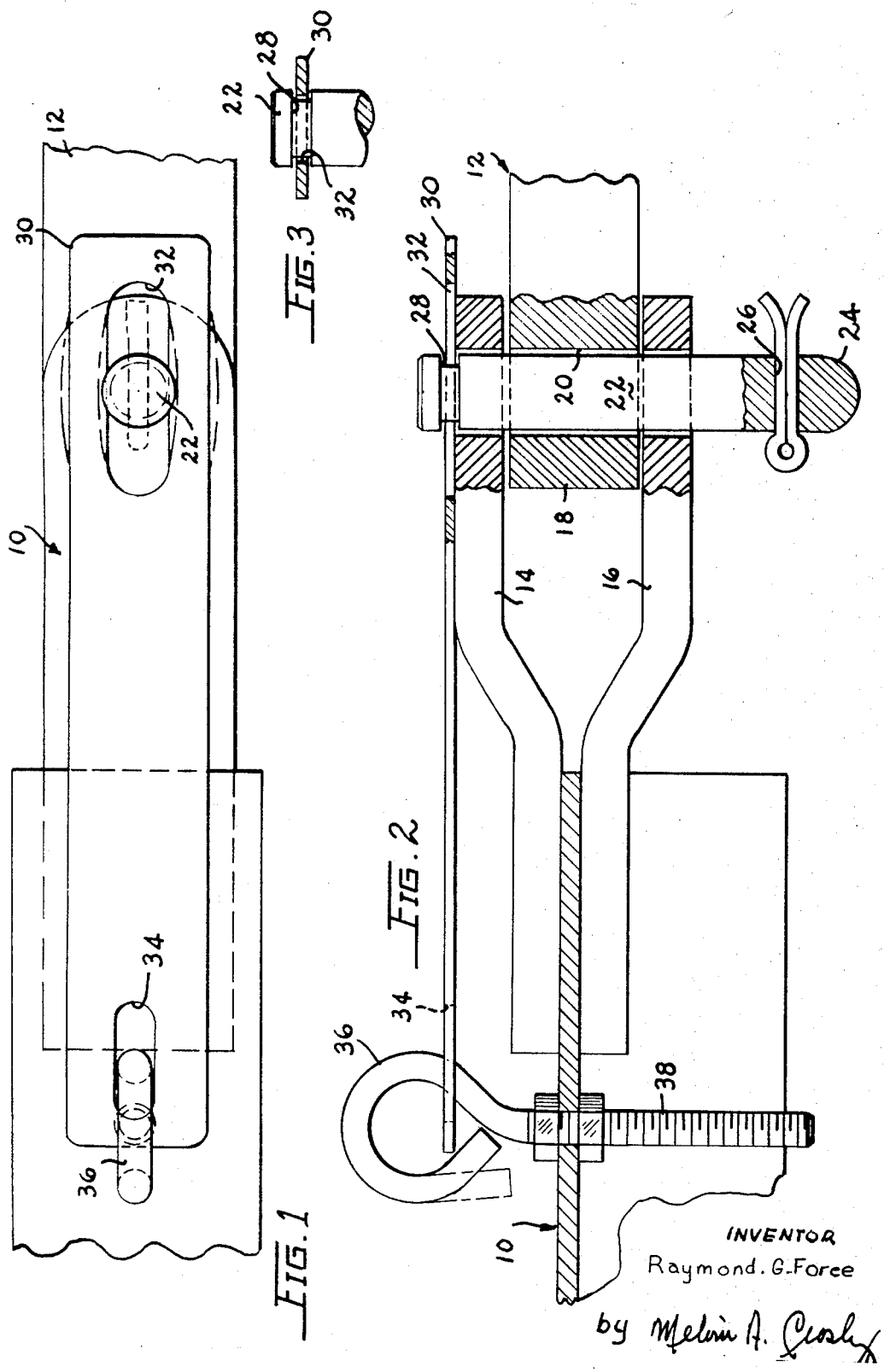
INVENTOR
Raymond. G. Force
by Melvin A. Crosly

United States Patent Office 3,429,586
Patented Feb. 25, 1969

3,429,586
HITCH PIN CONSTRUCTION
Raymond G. Force, R.R. 2, Greenville, Ohio 45331
Filed Mar. 6, 1967, Ser. No. 620,847
U.S. Cl. 280—515  4 Claims
Int. Cl. B60d 1/02

ABSTRACT OF THE DISCLOSURE

Hitch pin rotatably and slidably supported on a bar which is swingably supported on one element of a hitch structure.

---

The present invention relates to an improved hitch pin arrangement.

Hitch pins are known and are pins that drop into holes provided in the interengaging elements of a hitch structure. Such hitch structures are found, for example, on farms and in industry for connecting draft implements such as tractors to drawn devices such as trailers or ground working implements, or the like. One element of the hitch structure is on the draft implement and the other is on the drawn device. One element is usually a clevis or yoke with two vertically spaced bar-like arms while the other element is in the form of a single bar-like arm adapted to be received between the two arms. A hole through the arms receives a pin which is usually connected to the two armed element by a small chain.

Such a chain is liable to catch weeds and can easily be broken and does nothing to orient the pin with the holes in the arms when a hitch is being connected.

The present invention proposes to support such a hitch pin that it is easy to insert in the hole in the arms while being free to move so as to align itself with the arms.

The present invention proposes, further, to eliminate the conventional easily broken chain and to replace it with a support for the pin which will, at one time, support the pin for easy insertion into the hole in the hitch, will permit fore and aft movement of the pin for alignment of the pin with the hole, will permit random rotation of the pin to distribute wear thereover, and will also tend to hold the pin in the hole.

The nature of the present invention will be more easily and clearly comprehended upon reference to the following specification and to the accompanying drawings in which:

FIGURE 1 is a plan view showing the present invention;

FIGURE 2 is a longitudinal vertical section showing the invention; and

FIGURE 3 is a transverse section through the upper end of the pin and the support bar therefor.

Referring to the drawings more in detail, 10 and 12 are parts of a hitch structure. One of parts 10, 12 is on the back of a drawing device, a tractor, for example, and the other is on the front of a drawn device. Part 10 has upper and lower arms 14, 16 while part 12 has a single arm 18 therebetween. Other arrangements of the overlapping arms are possible.

Arms 14, 16 and 18 have holes therein which align to form a hole 20 for receiving hitch pin 22 to hold the hitch parts together for relative rotation on the axis of the pin.

Pin 22 has a tapered or rounded bottom end 24 for easy insertion of the pin into hole 20. Bore 26 in the lower end of the pin can receive a lock element when the pin is disposed in hole 20.

The upper end of the pin has an annular groove 28 formed therein. The pin is carried by a bar 30 having a longitudinal slot 32 therein near one end which has a lateral width smaller than the diameter of pin 22 but larger than the root diameter of groove 28. The axial length of groove 28 is slightly greater than the thickness of bar 30. The bar is deformed to receive the upper end of pin 22 and is then restored to shape to hold the pin in slot 32. The pin can rotate in the slot, slide longitudinally thereof and tilt therein to a degree.

Bar 30, at the end opposite slot 32 has a hole 34 which is engaged by eye 36 of eye bolt 38. Eye bolt 38 is attached to one of hitch parts 10, 12, preferably part 10 as shown so as always to go with the drawing device.

It will be appreciated that when the hitch parts are brought together, the bar 30 makes it convenient to present the pin 22 to hole 20 in the proper position for easy insertion in the hole. This is of special merit when gloves are worn which make it difficult to manipulate a pin but can easily manipulate the rather long bar 30.

Bar 30 also provides weight to hold the pin in the hole so that, if not locked therein, it will not easily bounce out of the hole. The pin, furthermore can rotate and slide in the bar so that wear is distributed over the entire circumference thereof and no difficulties occur in placing the pin in hitch connecting position.

It will be understood that the distance from the place on the hitch that can receive the eye bolt and the hole for the hitch pin will vary and, also, some hitches are provided with more than one hole. Slot 32 is thus important.

Bar 30, it will be appreciated, does not tend to catch weeds or snag on anything and thus provides for a more stream line hitch assembly than is possible with the use of a chain as a keeper for the pin.

It will also be seen that, with the arrangement of the present invention, a pry bar can be used to extract the pin from the hole, if necessary, which is difficult to do when a chain connects the pin to the hitch part. Also, if necessary to drive the pin into the hole, the pin can be safely held by grasping the bar and driven which would not be possible with a chained pin.

It will be understood that this invention is susceptible to modification in order to adapt it to different usages and conditions and accordingly, it is desired to comprehend such modifications within this invention as may fall within the scope of the appended claims.

What is claimed is:

1. In a hitch structure in which a first hitch part overlaps a second hitch part and holes in the hitch parts align to define a hole in the hitch structure to receive a hitch pin, the improvement comprising; a bar, means swivelly connecting one end of the bar to one of said hitch parts, the other end of said bar having a longitudinal slot therein, said slot having closed ends and parallel sides, a pin extending at right angles to said bar and larger in diameter than the width of said slot, said pin having a groove near one end into which the bar along the sides of the slot extends, said pin being rotatable in said slot and slidable in the slot in the direction of the length of the slot.

2. A hitch structure according to claim 1 in which said means connecting the one end of the bar to one of said hitch parts comprises a hole formed in the one end of the bar and an eye bolt engaging said hole and adapted for being fixed to said one hitch part.

3. A hitch structure according to claim 2 in which the end of said pin opposite its connection to said bar is tapered to facilitate insertion of the pin into said hole.

4. A hitch structure according to claim 1 in which said groove in axial length is only slightly larger than the thickness of said bar whereby the pin remains in substantial parallelism with itself in all positions thereof in said slot.

References Cited

UNITED STATES PATENTS 2,654,613  10/1953  Blair et al. _____ 280—515

LEO FRIAGLIA, *Primary Examiner.*

R. R. SONG, *Assistant Examiner.*